United States Patent [19]

Figone et al.

[11] Patent Number: 5,428,911

[45] Date of Patent: Jul. 4, 1995

[54] COMPLIANT DISPLAY APPARATUS FOR A VEHICLE IDENTIFICATION PLATE

[75] Inventors: Frank Figone, Belmont; Eric Seubert, Hayward; Tony Cecil, San Mateo; Craig Gomes, Daly City; Scott Carpenter, Fremont; Donna Stahl, Foster City, all of Calif.

[73] Assignee: GFS Creations, San Mateo, Calif.

[21] Appl. No.: 4,717

[22] Filed: Jan. 14, 1993

[51] Int. Cl.⁶ .............................................. G09F 7/18
[52] U.S. Cl. ....................................... 40/209; 40/152
[58] Field of Search ................. 40/154, 152, 152.1, 40/209

[56] References Cited

U.S. PATENT DOCUMENTS 2,499,747  3/1950  Griffith .................................. 40/209
4,170,838  10/1979  Bott ...................................... 40/209

FOREIGN PATENT DOCUMENTS 2485903  1/1982  France ................................ 40/154
07896  6/1991  WIPO .

*Primary Examiner*—Kenneth J. Dorner
*Assistant Examiner*—Cassandra Davis
*Attorney, Agent, or Firm*—Flehr, Hohbach, Test, Albritton & Herbert

[57] ABSTRACT

A mountable display apparatus for surrounding the edges of a vehicle identification plate mounted within the plate well of a vehicle. The display apparatus includes a substantially pliant frame having an inner edge defining an opening for exposing a portion of the identification plate. The frame is flexible to conform to the contour of the plate well for surrounding the edges of the identification plate independent of the size of the plate well such that, when the frame is larger than the plate well, the frame is deformed to position the frame substantially within the plate well when the identification plate is secured to the vehicle.

7 Claims, 3 Drawing Sheets

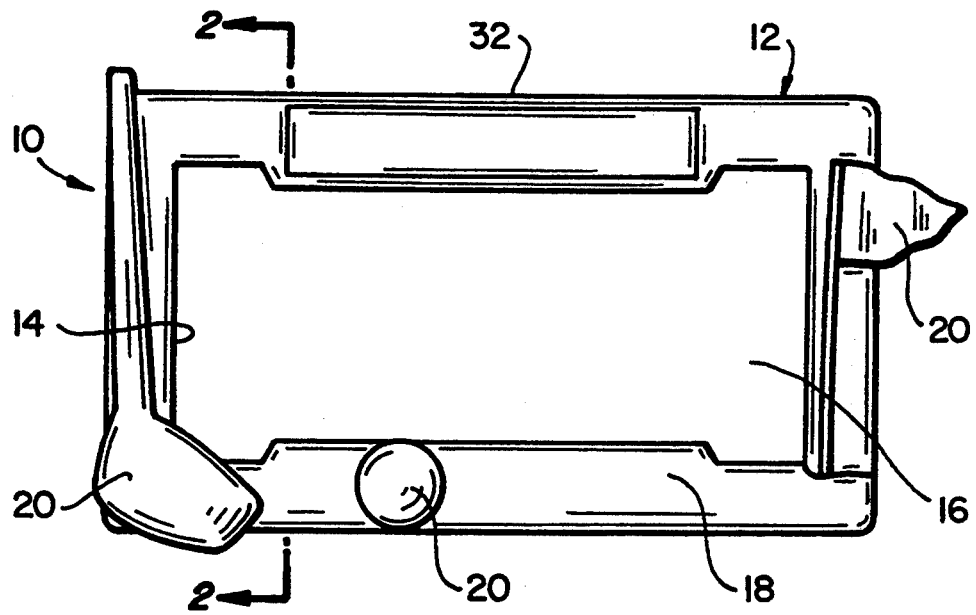
FIG_1
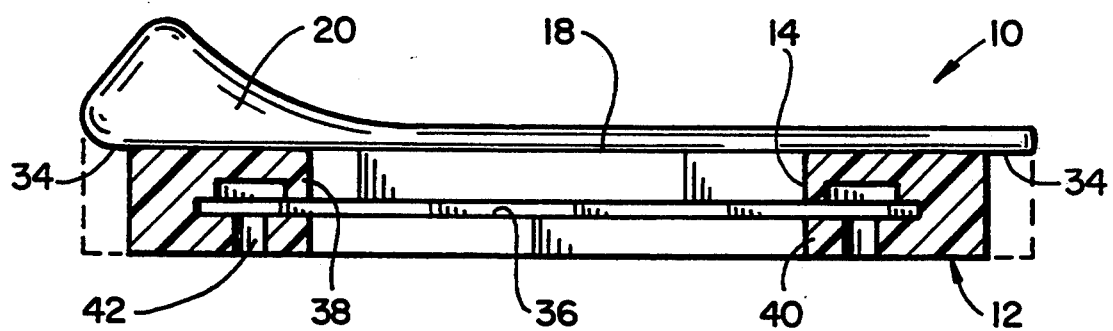
FIG_2

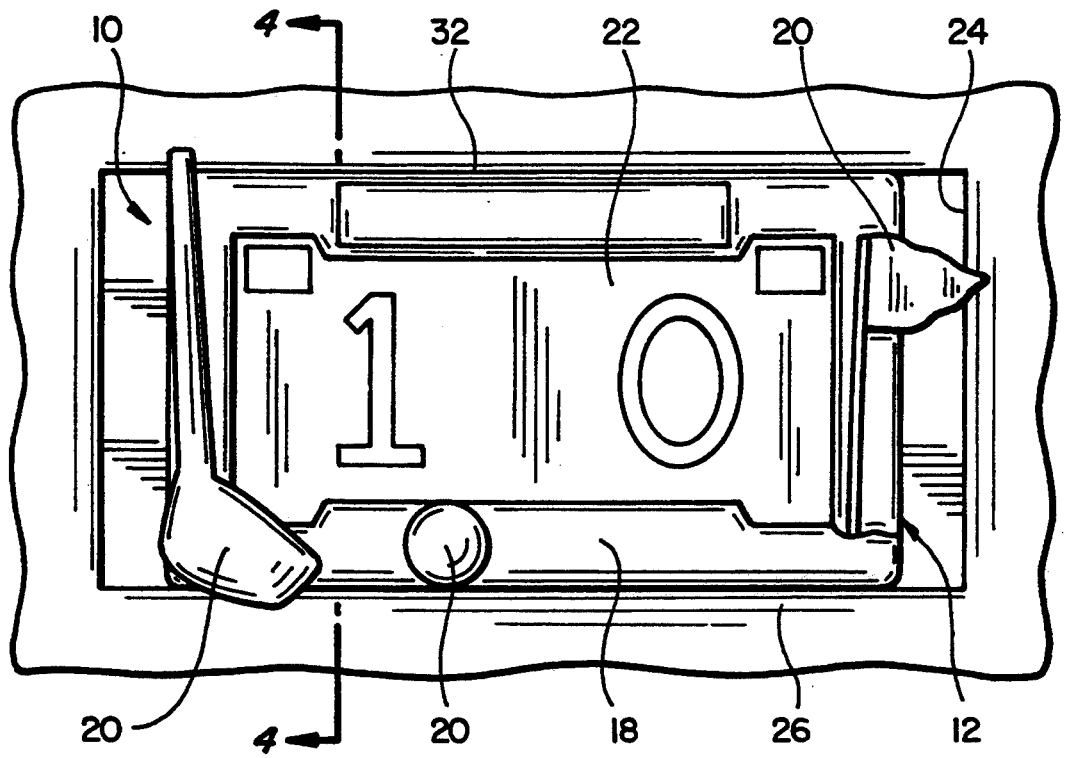
FIG_3
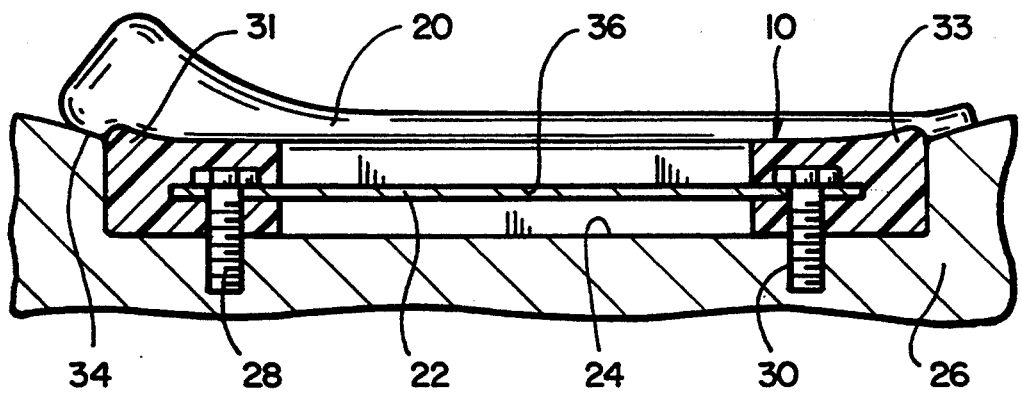
FIG_4

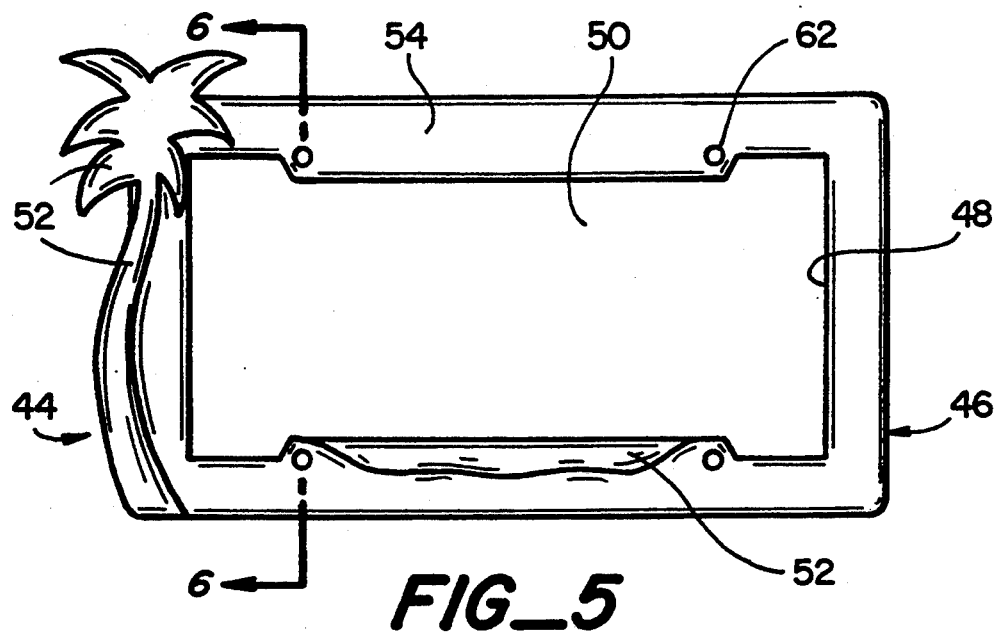
FIG_5
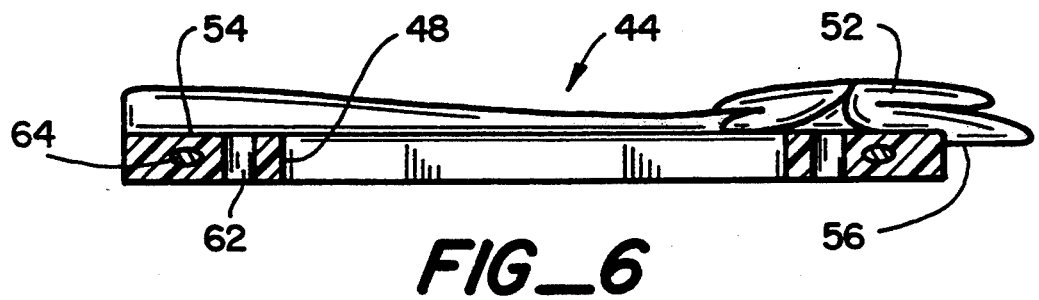
FIG_6
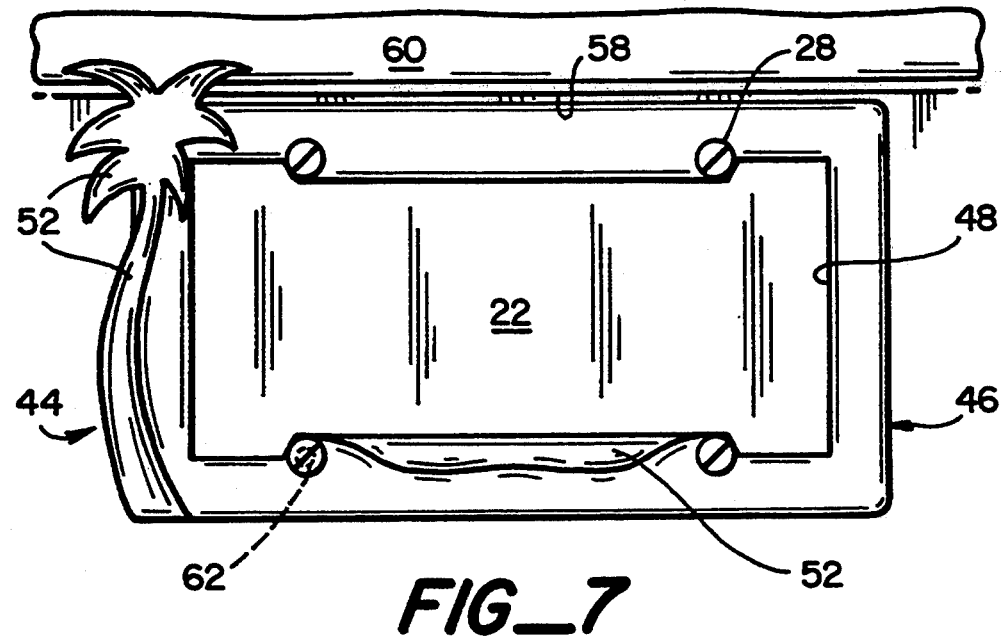
FIG_7

COMPLIANT DISPLAY APPARATUS FOR A VEHICLE IDENTIFICATION PLATE

BRIEF DESCRIPTION OF THE INVENTION

The present invention relates in general to a display apparatus for a vehicle identification plate. More particularly, the present invention relates to a frame for the license plate of a vehicle.

BACKGROUND OF THE INVENTION

The license plates used for vehicle identification are typically bolted in predetermined locations at the front and rear of the vehicle. The edges of the substantially flat, rectangular plate have an unfinished appearance which detracts from the overall appearance of the vehicle. License plate frames provide a decorative border for covering the unappealing edges of the identification plate to provide a finished, more attractive appearance.

Since the license plate frame is prominently displayed for other vehicles, the frame provides an excellent medium of communication. At the time of purchase, a license plate frame imprinted with the name and location of the dealership is mounted to the vehicle. Many consumers remove the dealer's frame and substitute one displaying a more personal phrase or slogan. Several standard expressions and designs are available, or the consumer may specify the particular wording he desires for the frame.

The area of the vehicle designated for the mounting of a license plate varies in size dramatically from one vehicle to another. Certain vehicle designs include a plate well provided for displaying the identification plate. Others have an open area bordered by an overhanging obstruction such as a light source for illuminating the license plate at night. The contour and dimensions of the mounting area differs between models of the vehicles and years of production. Often, a frame will be too large to fit within the space designated for holding the license plate. Alternatively, the placement of the plate mounting holes on the vehicle may be sufficiently near a limiting obstruction to prevent the application of the frame.

Since license plate frames are constructed from a rigid material, they may not be adapted to fit every vehicle. In frustration, the consumer will attempt to modify the rigid frame to forcefully secure it to the vehicle, usually damaging the frame or the vehicle in the process. Whether a particular frame will fit on a vehicle is not evident until the consumer has attempted to mount the frame in place. Thus, the consumer risks incurring unnecessary expense, frustration and disappointment when purchasing a license plate frame. A license plate frame which may be applied to a vehicle independent of the size of plate well is therefore highly desirable.

A frame having substantially the same size as the identification plate could be mounted to most vehicles. While this type of frame would conceal the unattractive edges of the license plate, the reduced size greatly restricts any use of the frame for communication. Displaying entertaining slogans and designs is one of the more appealing features of a license plate frame. Thus, a frame for an identification plate which provides a substantial surface area for communication while being adaptable for mounting to any vehicle is particularly desirable.

OBJECTS AND SUMMARY OF THE INVENTION

It is a primary object of the present invention to provide a display apparatus for an identification plate which may be used with any vehicle.

A further object of the present invention is to provide a display apparatus for an identification plate which may be positioned within the plate well of a vehicle independent of the size of the vehicle.

Another object of the present invention is to provide a display apparatus for an identification plate which conforms to the contour of the vehicle plate well when mounting the identification plate to the vehicle.

Yet another object of the present invention is to provide a display apparatus for an identification plate offering enhanced communication capabilities.

A more general object of the present invention is to provide a display apparatus for an identification plate which is decorative and easy to apply to the vehicle.

In summary, the present invention provides a mountable display apparatus which is particularly suitable for surrounding the edges of a vehicle identification plate independent of the size of the vehicle plate well. The display apparatus of the present invention includes a substantially pliant frame having an inner edge defining an opening for exposing a portion of the identification plate. The frame is flexible to conform to the contour of the plate well. When the frame is larger than the plate well, it is deformed for placement substantially within the plate well. Thus, the frame of the present invention may be used to conceal the edges of the identification plate independent of the size of the plate well.

In one embodiment, the frame includes a channel formed in the inner edge for receiving the edges of the identification plate. The frame may thereby be wrapped around the identification plate before mounting to the vehicle.

In an alternative embodiment, the pliant frame includes a reinforcing structure to retain the frame against the identification plate when mounted to the vehicle. This prevents bowing of the frame with respect to the identification plate.

Additional objects and features of the invention will be more readily apparent from the following detailed description and appended claims when taken in conjunction with the drawings.

BRIEF DESCRIPTION OF THE DRAWINGS

FIG. 1 shows a top plan view of a mountable display apparatus in accordance with the present invention FIG. 2 shows a cross sectional view taken along line 2—2 of FIG. 1.

FIG. 3 shows a top plan view of a mountable display apparatus in accordance with the present invention, shown mounted to a vehicle.

FIG. 4 shows a cross sectional view taken along line 4—4 of FIG. 3.

FIG. 5 shows an alternative embodiment of a display apparatus in accordance with the present invention.

FIG. 6 shows a cross sectional view of taken substantially along line 6—6 of FIG. 5.

FIG. 7 shows an top plan view of the alternative embodiment of a display apparatus of the present invention, shown mounted to a vehicle.

DETAILED DESCRIPTION OF THE INVENTION

Reference will now be made in detail to the preferred embodiment of the invention, which is illustrated in the accompanying figures. Turning now to the drawings, wherein like components are designated by like reference numerals throughout the various figures, attention is directed to FIGS. 1 to 4.

A mountable display apparatus 10 incorporating the present invention is shown generally in FIGS. 1 and 2. The display apparatus, which is particularly suitable for framing a license plate secured to any vehicle, includes a substantially pliant frame 12 having an inner edge 14 defining a central opening 16. The central opening exposes a portion of an identification plate, displaying the license plate number, state of origin and registration expiration date. Pliant frame 12 includes a substantially planar surface 18 and a raised decorative portion, generally indicated at 20, protruding from the planar surface. In the illustrated embodiment, the decorative portion represents a golf club, golf ball and pin flag. However, any design or decorative scheme may be substituted.

Pliant frame 12 may be deformed to mount the frame to any vehicle. As is shown in FIGS. 3 and 4, the pliant frame surrounding identification plate 22 is positioned substantially within plate well 24 of vehicle 26. Mounting bolts 28 inserted within mounting holes 30 of the vehicle secure the identification plate and frame 12 to the vehicle. Due to the constraints imposed by the plate well, the pliant frame is deformed as is generally indicated at 31 and 33 for positioning substantially within plate well 24. In the present embodiment, the size of the plate well of the vehicle requires deformation of the frame. The vehicle may include projections or overhanging obstructions such as an illumination source which, when combined with the positioning of the mounting holes, require substantial deformation of a portion of frame 12. Alternatively, no deformation of pliant frame 12 may be required. Thus, the flexibility of the pliant frame enables display apparatus 10 to be used with any vehicle.

As is shown particularly in FIG. 2, raised portion 20 is generally three-dimensional, protruding from the planar surface of the frame. Additionally, the decorative portion extends beyond the general perimeter 32 of frame 12. The provision of decorative portion 20 enhances the communicative capabilities of the pliant frame. The raised decorative features are more visible to the other drivers than a planar depiction, drawing the viewer's attention and ensuring that the message is received. By extending the decorative portion beyond the perimeter of pliant frame 12, the amount of surface area available for communication is substantially increased. In the present embodiment, the driver is displaying his interest in golf. The decorative portion captures the attention of the other drivers and entices them to read a slogan displayed on frame 12. This is particularly important for the driver who desires to use display apparatus 10 for advertising.

Decorative portion 20 is also flexible and may be easily deformed for mounting pliant frame 12 to a vehicle. The raised portions will conform to the contour of plate well 24 or other limiting obstructions. Since the pliant frame conforms to the constraints imposed by the vehicle, no modification is necessary when installing the frame. Thus, the consumer may easily apply the display apparatus of the present invention independent of the size of the plate well of his vehicle.

Pliant frame 12 includes areas of reduced thickness, generally indicated at 34, and defined by a cut-away portion of the frame 12 beneath the decorative portion 20 for increasing the pliancy of the frame. In the illustrated embodiment, the portion indicated by the interrupted underneath raised portion 20 adjacent the perimeter of the frame has been removed, forming an area of reduced thickness where the frame thickness is substantially equivalent to the thickness of decorative portion 20. The flexibility of the decorative portion is thereby increased, facilitating the deformation of the frame when mounting the identification plate to the vehicle. Similarly, if desired a greater portion of pliant frame 12 may be undercut, further increasing the flexibility of the frame. Alternatively, a smaller portion of the frame may be undercut as shown in FIG. 6. Thus, the present invention provides a frame having a substantial surface available for communication which may be easily installed on any vehicle.

As is shown in FIGS. 2 and 4, in the present embodiment pliant frame 12 includes a channel 36 formed in inner edge 14. The channel is configured for receiving the edges of identification plate 22. Before mounting the identification plate to the vehicle, display apparatus 10 is wrapped around the plate edges by initially stretching the pliant frame and inserting the edges of the identification plate within channel 36. This particular embodiment has several features of advantage. Inserting the identification plate within channel 36 reinforces the pliant frame and retains the frame against the identification plate. Thus, a low modulus material offering greater compliance may be used. Since the edges of the identification plate are isolated, the paint on the vehicle is protected from the scratching which often occurs when securing the identification plate to the vehicle. Additionally, the pliant frame provides insulation which dampens the vibration induced by the motion of the vehicle, eliminating plate rattle.

The channel extends between opposed front and back walls 38 and 40 of pliant frame 12. Apertures 42 are formed in back wall 40 for securing the identification plate to the vehicle. When mounting the license plate, front wall 38 is pried away from license plate 22 while mounting bolts 28 are inserted through apertures 42. Once the bolts have been tightened and the plate and frame mounted to the vehicle, the front wall conceals the mounting bolts from view. Securing pliant frame 12 to the vehicle provides increased security and prevents theft of the frame. Forming front wall 38 without apertures enhances the attractiveness of display apparatus 10 by concealing the mounting bolts and increases the surface area of pliant frame 12 available for communication. While in the preferred form apertures are formed only in back wall 40, it is within the scope of the present invention to form apertures in the front wall to further simplify the installation of the display apparatus.

An alternative embodiment of a mountable display apparatus 44 incorporating the present invention is shown in FIGS. 5 to 7. Display apparatus 44 includes substantially pliant frame 46 having an inner edge 48 defining a central opening 50 for exposing a portion of the identification plate. A raised decorative portion 52 protrudes from a substantially planar surface 54. The frame and the decorative portion are substantially pliant and may be deformed to conform to the plate well or other limiting obstruction of the vehicle. Pliant frame 46 includes an area of reduced thickness 56 for increased pliancy formed substantially below the decorative portion adjacent the perimeter of the frame. The area of reduced thickness facilitates the deformation of pliant frame 46 when mounting display apparatus 44 to the vehicle.

Turning to FIG. 7, pliant frame 46 is shown mounted in plate well 58 of a vehicle having an overhanging obstruction 60. In the present embodiment, the display apparatus is secured in front of the identification plate with pliant frame 46 covering the plate edges. The pliant frame has apertures 62 which correspond to the mounting holes formed in the identification plate. Mounting bolts extend through the frame and identification plate to secure the frame in place. Decorative portion 52, in this embodiment the branches of a tree, conforms to obstruction 60. Thus, the display apparatus has been mounted to the vehicle without modification of either the vehicle or the frame.

The flexibility of the frame increases the tendency of the frame to bend away from the identification plate. To minimize the tendency to bow away from the identification plate the area of reduced thickness must be thin enough with respect to the modulus of the material used in construction. If the modulus and undercut design is not matched properly, the resulting bowing will detract from the attractive appearance of the frame and interfere with the visibility of the license plate number. Therefore, in the present embodiment pliant frame 46 further includes a stiffening wire 64 embedded within the material of the frame. The stiffening wire provides sufficient reinforcement to retain the pliant frame substantially against the identification plate when mounted to the vehicle without reducing the pliancy at the perimeter of the frame.

In the preferred embodiment, stiffening wire 64 extending substantially around central opening 50 is embedded within pliant frame 46. However, sufficient reinforcement may be provided by embedding discrete sections of wire within the pliant frame. Alternatively, the stiffening structure need not be embedded within the frame, but may instead be applied to the back of the frame. With the addition of stiffening wire 64, pliant frame 46 may be formed of a low modulus material offering increased flexibility.

The pliant frame of the present invention may be formed of any conventional compliant and resilient material which has sufficient stiffness for retaining the frame substantially against the identification plate. Examples of preferable materials are foam or elastomers. By adding of a stiffening structure, low modulus materials offering greater compliance may be incorporated.

As is apparent from the foregoing discussion, the present invention provides a display apparatus for a vehicle identification plate which may be used with any vehicle. The pliant frame conforms to the size of the vehicle plate well and other obstructions for simple installation without modification. The decorative portion and extended surface area greatly enhance the communicative capabilities of the present invention. Additionally, the display apparatus of the present invention will not break on impact.

What is claimed is:

1. A mountable display apparatus for displaying a vehicle identification plate mounted to a plate well of a vehicle, said identification plate having a peripheral edge, said display apparatus comprising:

a substantially pliant frame mountable to said identification plate, said frame being shaped to surround said peripheral edge of said identification plate and having an inner edge defining an opening for exposing a portion of said identification plate, said frame being flexible to conform to the contour of said plate well when said frame is mounted to said identification plate and said identification plate is mounted to said plate well with said frame surrounding said peripheral edge of said identification plate within said plate well independent of the size of said plate well such that, when said frame is larger than said plate well, said frame is deformed to position said frame substantially within said plate well; and means for reinforcing said frame to substantially retain said frame against said identification plate when said identification plate is secured to said vehicle, said reinforcing means comprising a stiffening wire embedded within said frame.

2. The apparatus of claim 1 further comprising a channel formed in said inner edge of said frame, said channel being configured for receiving said edges of said identification plate.

3. The apparatus of claim 2 wherein said channel extends between opposed front and back walls, said back wall having a plurality of apertures formed therethrough for mounting said frame to said vehicle.

4. The apparatus of claim 3 wherein said front wall conceals said apertures formed in said back wall, said front wall being flexible for bending said front wall away from said back wall to provide access to said apertures in said back wall and mounting holes in said identification plate when mounting said frame and said identification plate to said vehicle.

5. The apparatus of claim 1 wherein said frame having a front surface said front surface has a substantially planar portion and a decorative portion protrudes from said planar portion, said front surface of said frame being shaped such that when said frame is mounted to said identification plate, said planar portion is parallel to said portion of said identification plate exposed by said opening of said frame.

6. The apparatus of claim 5 wherein said frame has an outer edge and said decorative portion exceeds beyond said outer edge of said frame, said frame being shaped such that when said frame is mounted to said identification plate, said outer edge is substantially parallel to said peripheral edge of said identification plate, said decorative portion being flexible to conform to said plate well for positioning said frame substantially within said plate well.

7. The apparatus of claim 1 wherein said frame has a front surface having a shaped decorative portion and a substantially planar back surface, a portion of said back surface being undercut beneath said decorative portion to provide said frame with an area of reduced thickness increasing the flexibility of said frame proximate said area of reduced thickness for positioning said frame substantially within said plate well independent of the size of said plate well.

* * * * *